United States Patent [19]

Grasso et al.

[11] Patent Number: 5,210,808
[45] Date of Patent: May 11, 1993

[54] UNIT FOR AMPLIFYING LIGHT SIGNALS IN OPTICAL FIBER TRANSMISSION LINES

[75] Inventors: Giorgio Grasso, Monza; Aldo Righetti, Milan, both of Italy

[73] Assignee: Pirelli Cavi S.p.A., Milan, Italy

[21] Appl. No.: 699,920

[22] Filed: May 14, 1991

Related U.S. Application Data

[63] Continuation-in-part of Ser. No. 552,918, Jul. 16, 1990, abandoned.

[30] Foreign Application Priority Data

Jul. 17, 1989 [IT] Italy .................... 1207 A/89
May 25, 1990 [IT] Italy .......................... 20434

[51] Int. Cl.[5] .................... H04B 9/00; G02B 6/26
[52] U.S. Cl. ...................... 385/27; 359/154;
                                    359/156; 385/31; 385/39
[58] Field of Search ............ 385/15, 24, 27, 31,
        385/32, 39, 42; 359/154, 156, 173, 174, 179,
                                                   188, 195

[56] References Cited

U.S. PATENT DOCUMENTS

| | | | |
|---|---|---|---|
| 4,596,048 | 6/1986 | Dunki-Jacobs | 359/173 X |
| 4,704,741 | 11/1987 | Shikada | 359/173 X |
| 4,899,043 | 2/1990 | Mochizuki et al. | 359/156 X |
| 4,900,917 | 2/1990 | Dixon et al. | 359/156 X |
| 4,947,134 | 8/1990 | Olsson | 359/173 X |
| 5,007,698 | 4/1991 | Sasaki et al. | 385/15 X |

FOREIGN PATENT DOCUMENTS 90112920.5 7/1990 European Pat. Off.
52-155901 12/1977 Japan.
2220789 1/1990 United Kingdom.

OTHER PUBLICATIONS

Inoue et al., "Mutual Signal Gain Saturation in $Er^{3+}$-Doped Fibre Amplifier...", Electronics Lett., vol. 25, No. 9, Apr. 1989, pp. 594–595.
Electronics Letters, vol. 24, No. 1 Jan. 7, 1988, pp. 36–38 Gimlett et al., IEEE Phot. Techn. Let. vol. 2, No. 3, Mar. 1990, pp. 211–213.
IEEE Photonics Technology Letters, vol. 1, No. 10, Oct. 1989, pp. 334–336 IEEE, N.Y., USA; M. Z. Igbal et al.
Proceedings of the 15 European Conference on Optical Communication ECOC 1989, Gothenburg, 9-10-14/1989, vol. 3, pp. 42–45; A. Righetti et al.
Patent Abstracts of Japan, vol. 13, No. 8 E-702 [3356] Jan. 10, 1989, p. 72 E 762; & JP-A-63-219 186 Nippon Tel. & Tel. Corp.

Primary Examiner—Akm E. Ullah
Attorney, Agent, or Firm—Brooks Haidt Haffner & Delahunty

[57] ABSTRACT

Active-fiber optical amplifier connected to optical fiber lines or a telecommunication signal source through energy reflection limiting means, such as optical isolators, for limiting the reflected energy, due to Rayleigh scattering, which reaches the active fiber, to permit increased amplifier gain. The input of the active fiber is connected to a dichroic coupler which is also connected to a pumping energy source by an optical fiber having a bevelled end surface or an antireflection coating at the energy source end to limit reflection of energy to the active fiber. Also, a telecommunication system including one or more of such protected amplifiers.

31 Claims, 1 Drawing Sheet

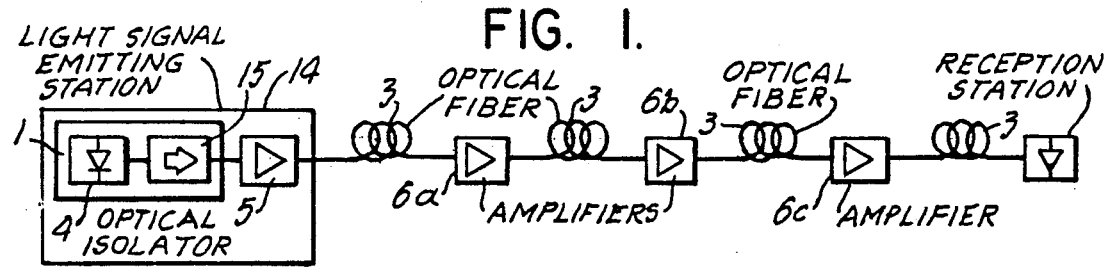

UNIT FOR AMPLIFYING LIGHT SIGNALS IN OPTICAL FIBER TRANSMISSION LINES

RELATED APPLICATIONS

This application is a continuation-in-part of application Ser. No. 552,918, filed Jul. 16, 1990 now abandonment entitled Unit for Amplifying Light Signals in Optical Fiber Transmission Lines and in the names of the present inventors.

Field of the Invention

The present invention relates to an optical fiber telecommunication line, provided with active-fiber optical amplifiers in which the reflections towards the amplifiers are contained below a predetermined value.

BACKGROUND OF THE INVENTION

It is known that optical fibers having a doped core in which the doping is carried out with the use of particular substances, such as rare earth ions, have stimulated emission features and are suitable for use in optical amplifiers in optical fiber telecommunication lines for civil telephony.

Such amplifiers are referred to in the European patent application No. 90112920.5, which corresponds to said U.S. application Ser. No. 552,918 of the assignee of this application.

By "fiber optical amplifiers", also referred to as "active fiber optical amplifiers", is meant amplifiers in which the optical transmission signal is amplified as such, while keeping its optical form without a conversion of the same to another form, such as, for example, an electronic conversion in which there is conversion of the optical signals to electrical signals amplification of the electrical signals and a conversion of the electrical signals to the optical form. In fiber optical amplifiers, the amplifying element consists of a portion of optical fiber of the type described having a predetermined length, connected in series between two lengths of optical line fiber and provided with feeding means to feed the optical pumping signal.

Fiber optical amplifiers have particular advantages for use in telecommunication lines as they offer high gains when they are utilized as line amplifiers, and such gains can be brought to the desired value by suitably selecting the active fiber length and/or dopant content or, should they be used as power amplifiers, they offer a high amplification efficiency.

Particularly detrimental to such amplifiers are the signal reflections which occur at the ends of the fiber itself.

From Japanese patents 52-155901 and 63-219186 and from "ELECTRONICS LETTERS", vol. 24, no. 1, 7th Jan. 1988, pages 36–38, it is known that, in a laser or optical semiconductor amplifier, there is the risk of instability and arising of oscillations due to the reflections at the amplifier ends.

In the above patents and article, in order to eliminate these reflections, it is broadly taught to couple an optical isolator to the semiconductor laser, which prevents the light reflected by the coupling surfaces between the line fibers and these devices from reaching the lasers themselves.

In an active-fiber amplifier, no interface surfaces are present between the line fibers and the amplifier because the line fibers are directly welded to the active fiber of the amplifier. Therefore, the reflection phenomena are not generally expected.

However, it has been discovered that in an active-fiber amplifier, in the absence of means limiting reflections toward the active fiber, it is impossible to reach high amplification gains due to the occurrence of noise of the interferometric type as a result of beats between the direct signal and reflected signals in the line fibers themselves and, at all events, directed toward the active fiber. The presence of interferometric noise is of little importance in a semiconductor amplifier which has low gains and small construction sizes, whereas it becomes particularly important in an active-fiber amplifier capable of reaching very high gains and having an active fiber of significant length, generally in the range of some tens of meters and much greater than the coherence distance of the signal generating laser.

Therefore, in an amplifier of the active core fiber type, the problem arises of protecting the active fiber with respect to such noise source and keeping each form of reflection toward the active fiber itself below critical values so as not to jeopardize the transmission quality while maintaining high values of the amplification gain.

The above-cited European patent application No. 90112920.5 teaches the introduction of optical isolators in fiber optical amplifiers, said isolators having a reflectivity limited to below a critical value.

SUMMARY OF THE INVENTION

The present invention aims at providing an optical fiber telecommunication line comprising active-fiber optical amplifiers, as distinguished from semiconductor amplifiers, in which the amplifiers are protected against the drawbacks resulting from reflections, which uses fiber optical amplifiers of the type described in European patent application No. 90112920.5 and which employs critical parameters permitting one to choose the most suitable optical isolation characteristics for the expected amplifier gain.

It is an object of the present invention to provide an optical fiber telecommunication line, in which an optical transmission signal is transmitted from one end of the line to the other end without conversion to non-optical form and regeneration, and includes along such line at least a fiber optical amplifier which comprises an active optical fiber length having a doped core in which the dopant is a fluorescing substance, characterized in that all fibers connected to the active fiber of the amplifier or belonging to each amplifier have reflection limiting means the reflectivity of which, seen from the face end of the active fiber, is lower by at least 10 dB than the reflectivity corresponding to the Rayleigh scattering in the line fiber at the transmission wavelength Preferably, the reflection limiting means cause reflectivities of the fibers connected to the active fiber which are lower than the reflectivity corresponding to the Rayleigh scattering in the fibers at the transmission wavelength by at least 15 dB.

According to a particular embodiment, for the purpose of reaching high amplification gains, all fibers connected to the amplifier's active fiber or belonging to each amplifier are provided with reflection limiting means having a reflectivity, seen from the face end of the active fiber, with an absolute value of higher by at least 10 dB and preferably at least 15 dB than the expected amplifier gain.

The reflection limiting means comprises polarization control optical isolators located upstream and downstream of, and hence, in series with, the optical active fiber of the amplifier.

The optical isolators are of a type insensitive to the polarization of the transmission signal.

The fibers connected to the amplifier's active fiber, which do not have optical isolators in series therewith, have anti-reflection coatings and/or an oblique cut of the surface(s) passed through by the transmission signal giving rise to a reflectivity at the transmission signal wavelength lower by at least 10 dB and preferably at least 15 dB than the reflectivity corresponding to the Rayleigh scattering in the fiber at the transmission wavelength, or the absolute value of which is higher by at least 10 dB and preferably at least 15 dB than the expected amplifier gain.

A further object of the present invention is an optical amplifier of the active fiber type for optical fiber telecommunication lines comprising an active optical fiber having a core doped with a fluorescing substance and connected at the ends thereof to the optical fibers of a telecommunication line, the active optical fiber also being connected, through respective coupling means, by at least an optical fiber connected to a source of an optical pumping signal, characterized in that all fibers connected to the active fiber exhibit reflection limiting means causing a reflectivity, seen from the facing end of the active fiber, lower by at least 10 dB and preferably at least 15 dB, than the reflectivity corresponding to the Rayleigh scattering in the transmission fiber at the transmission wavelength, or the absolute value of which is higher by at least 10 dB and preferably at least 15 dB than the expected amplifier gain.

In the above amplifier, the reflection limiting means comprises polarization control optical isolators located upstream and downstream of the active optical fiber, and the optical isolators are of the type insensitive to polarization.

Each optical isolator has a reflectivity towards the active fiber at the wavelength of the transmission signal lower by 10 dB and preferably 15 dB than the reflectivity given by the Rayleigh scattering in the line fiber, or the absolute value of which is higher by at least 10 dB and preferably at least 15 dB than the expected amplifier gain.

The optical fiber connected to the optical pumping source is devoid of optical isolators, and at the end thereof connected to said source, is provided with reflection limiting means comprising antireflection coating layers and/or an oblique cut of the surface(s) passed through by the transmission signal, said reflection limiting means supplying a reflectivity which is lower by 10 dB and preferably by 15 dB than the reflectivity resulting from the Rayleigh scattering, or the absolute value of which is higher by at least 10 dB and preferably at least 15 dB than the expected amplifier gain, the attenuations due to the passage of the transmission signal and reflected signal through the coupling means being included.

If the reflection limiting means is the oblique cut of the end of the optical fiber connected to the pumping signal source, it is preferably cut at an angle ranging between 5° and 10° with respect to the plane normal to the fiber axis.

The fiber connected to the source of the optical pumping signal is connected to one end of the active fiber through a dichroic coupler and the optical isolators are interposed between the active fiber and the input optical line fiber, at one end thereof, such as between the input line fiber and the optical coupler or between and the optical coupler and said end of the active fiber or both and an optical isolator is between the other end of the active fiber and the output fiber line. The fiber connected to the source of the optical pumping signal is connected to the active fiber through a dichroic coupler and an optical isolator can be interposed between the active fiber and the dichroic coupler.

In case of power amplifiers operating with a power transmission signal higher than the saturation power of the amplifier and connected at a position contiguous to the transmission signal emitting laser equipped with a protection optical isolator, a further optical isolator is present only at the downstream end of the active fiber in the transmission direction of the transmission signal.

BRIEF DESCRIPTION OF THE DRAWINGS

Other objects and advantages of the present invention will be apparent from the following detailed description of the presently preferred embodiments thereof, which description should be considered in conjunction with the accompanying drawings in which:

FIG. 1 is a schematic diagram of an optical fiber telecommunication line provided with line and power amplifiers;

FIG. 2 is a schematic diagram of an active-fiber optical line amplifier, according to a preferred embodiment of the invention;

FIG. 3 is a schematic diagram of an active-fiber optical line amplifier according to an alternative embodiment thereof; and FIG. 4 is a schematic diagram of an active-fiber optical power amplifier in accordance with the invention.

DETAILED DESCRIPTION OF PREFERRED EMBODIMENTS

As shown in FIG. 1, an optical fiber telecommunication line generally comprises a light signal emitting station 1, and a reception station 2, located a substantial distance from each other, e.g. hundreds or thousands of kilometers apart, for example. Interposed between the two stations is one or more lengths of an optical fiber 3, having suitable transmission characteristics, through which the signal is guided from one station to the other.

In order to cover the desired overall distance between stations 1 and 2, it is necessary first to send a signal of sufficient power and subsequently to compensate for the signal attenuation along the fiber. Therefore, the station 1 comprises, immediately after the laser 4 generating the optical signal to be transmitted, a power amplifier 5 adapted to deliver a signal to the line which has a higher power than the one achievable, or which can be conveniently generated, by the laser 4. In addition, after a certain fiber length, some hundreds of kilometers, for example, a first line amplifier 6a is present and is adapted to bring the signal back to a sufficiently high level. Such amplifier 6a is followed by further fiber lengths 3 and respective amplifiers 6b, 6c, etc., which are present to the extent necessary to provide an acceptable signal at the station 2.

Amplifiers 5, 6a, 6b and 6c can conveniently consist of fiber optical amplifiers. These amplifiers are particularly adapted to optical fiber telecommunication lines because the signal maintains the optical form and, therefore, its reading and conversion to an electronic form as well as electrical processing and amplification and a new conversion to the optical form for transmission through the optical fiber line 3 are not required. In fact, such latter operations restrict the line capacity, in particular, with respect to transmission speed which is limited by the processing speed of the electronic apparatus used.

On the contrary, in a fiber optical amplifier, the signal always remains in optical form, and therefore, it is not subjected to transmission speed restrictions and the like.

In addition, it is particularly convenient to use optical amplifiers of the active-core optical fiber type. In fact, these amplifiers allow particularly good performance to be achieved both with respect to gain and efficiency.

The structure of a fiber optical amplifier is diagrammatically shown in FIG. 2. The line fiber 3 in which a transmission signal which must be amplified travels at a wavelength $\lambda_s$ is connected to a dichroic coupler 7 in which the transmission signal is joined on a single outgoing fiber 8 with a pumping signal of wavelength $\lambda_p$, generated by a pumping laser emitter 9. An active fiber 10, connected to the fiber 8 coming out of the coupler constitutes the signal amplifying element which amplified signal introduced into the outgoing line fiber 3 and transmitted toward its destination.

In order to make the active fiber 10 forming the amplifying element of the assembly, a silicon-based optical fiber is used, and the core of which is doped with a fluorescing substance which, in the presence of luminous pumping light at the wavelength $\lambda_p$, is capable of generating a stimulated emission coherent with the signal at the transmission wavelength $\lambda_s$ so that the outgoing signal appears greatly amplified relative to the incoming signal.

It is known that in any fiber amplifier the gain G is related to the reflectivities $R_1$, $R_2$ measured at the ends thereof by the relation:

$$G(dB) - \tfrac{1}{2}(R_1(dB) + R_2(dB)),$$

in which reflectivities $R_1$, $R_2$ are defined as:

$$R(dB) = 10 \, log_e(P_r/P_t)$$

where $P_t$ is the transmitted power, whereas $P_r$ is the reflected power.

Substantially, the foregoing means that the achievement of high gains in the amplifier is limited by the reflection characteristics at the ends of the amplifier fiber itself, or, in other words, that in order to achieve high amplification gains, it is necessary to have high reflectivities $R_1$ and $R_2$.

In fact, if one part of the light signal present within the amplifier fiber is reflected back to the end thereof, said part is amplified, partly reflected again at the opposite end and introduced again into the amplifier fiber, the cycle being repeated several times. When said reflections and amplifications, in total, take a high value, it is possible to reach an oscillation condition which makes the correct operation of the amplifier impossible which dictates that the maximum amplification gain must be limited in order to avoid the occurrence of this phenomenon.

In addition to this phenomenon, the reflection back within the amplifier of the transmission signal itself by the reflecting elements downstream of the amplifier (the line fiber itself for example), where said reflection is amplified again and further reflected by reflecting elements located upstream of the amplifier, gives rise to a beat phenomenon between the direct and reflected signals, referred to as interferometric noise.

This interferometric noise becomes particularly important in the case of active-fiber amplifiers, which have a length of the amplifying element, that is the active fiber, greater than the length corresponding to the coherence time of the laser which has generated the signals. In fact, under these conditions, the coherence between the direct and the reflected signals is lost, the reflected signal becomes offset relative to the direct signal and, if it has sufficient intensity, it becomes detrimental to the transmission quality.

The reflections which can take place in the amplifier can be due to the presence of interface surfaces at the ends thereof as a result of the well known refraction phenomena, but also in the absence of these surfaces, as in the case of active fiber amplifiers, in which the amplifying element consists of an active fiber 10 directly welded to the coupler 7 and the line fibers, it is the scattering at the inside of the line fibers upstream and downstream of the amplifier (known as "Rayleigh scattering") which produces a reflection of the luminous power.

In fact, it has been noted that the Rayleigh scattering which occurs in the whole fiber, produces a reflectivity the value of which is about $-30$ dB Further reflection forms can be produced when strong luminous powers are transmitted due to the phenomenon known as "Brillouin scattering".

According to the present invention, the limitations to the maximum gain achievable in a line amplifier resulting from the above described reflection phenomena can be eliminated by arranging optical isolators 11a and 11b upstream and downstream of the amplifying fiber 10 as shown in FIG. 3. In particular, an optical isolator 11a is located upstream of the coupler 7, immediately after the incoming line fiber 3 and an optical isolator 11b is located downstream of the fiber 10 before the next length of line fiber 3.

Optical isolators are known and are devices adapted to allow the unidirectional passage of light. For the purposes of the present invention, the optical isolators are required to be of the type independent of the transmission signal polarization, to have an isolation degree at least higher than 20 dB and to exhibit a low reflectivity, at least lower by 10 dB than the reflectivity value given by the Rayleigh scattering in a fiber of an infinite length and preferably, lower by at least 15 dB than such value.

In fact, it has been found that the presence of isolators having the above characteristics ensures that the active element of the amplifier, that is the doped fiber, can operate under conditions which are far enough from those in which noises resulting from reflections of various nature, as above described, may occur in the presence of amplification gains usually achievable with fiber amplifiers and which are of about 30 dB, which value substantially corresponds to the absolute value of the reflectivity given by the Rayleigh scattering in a fiber of infinite length.

In order to achieve higher gains, a correspondingly low reflectivity value is required, which reflectivity in accordance with the invention must at all events have an absolute value higher by at least 10 dB, and preferably at least 15 dB, than the expected amplifier gain value.

For example, the foregoing means that in order to achieve a gain of 40 dB, the reflectivity towards the active fiber in each fiber connected to the active fiber itself is required to be at least lower than −50 dB and preferably lower than −55 dB for the transmission wavelength.

The prescribed reflectivity characteristics of the isolators can be achieved by known means, such as multilayer coatings, surfaces passed through by the transmission signal oblique to the propagation direction of the signal itself and the like. Such means is generally well known in the art, and therefore, it will not be further described.

In addition, in order to avoid noises given by reflections, in accordance with the present invention, the fiber 12, which transmits the luminous pumping power to the coupler 7, and therefore, to the active fiber 10, must also have a limited reflectivity towards the active fiber itself. In fact, a luminous power fraction at the transmission wavelength which propagates back to the coupler 7 is sent within the fiber 12, since couplers commonly used for the purpose in the two coupled branches do not have an absolute separation between the two wavelengths for which the coupler themselves are intended. Due to this lack of absolute separation, a not negligible percentage of luminous power at the transmission wavelength, in the range of some percent for example, is coupled on the coupler branch carrying the pumping power.

If this light fraction at the transmission wavelength, at the end of the fiber 12 where it is optically connected to the pumping laser 9, encounters a reflecting surface, it will be sent again, through the coupler 7, to the inside of the active fiber and it will contribute as well for the above described phenomena of generating interferometric noise.

Therefore, for the fiber 12, a reflectivity value lower by 10 dB, and preferably by 15 dB, than the value corresponding to the Rayleigh scattering in an infinite fiber less twice the attenuation value given by the passage of the transmission wavelength in the coupler's pumping branch is required.

In other words, it is desired that, at the end of the active fiber 10 connected to the fiber 8, the reflectivity on any fiber connected thereto be, in total, lower by at least 10 dB, and preferably by 15 dB, than that corresponding to the Rayleigh scattering in an infinite fiber, or correspondingly, the absolute value of which is higher than the expected gain. Also, the reflectivity at the opposite end of the fiber 10 must be restricted.

The prescribed reflectivity characteristics of fiber 12 can be achieved by expedients known in the art, such as multilayer coatings or oblique surfaces. In particular, an oblique cut of the end surface 13 of fiber 12 coupled to laser 9, at an angle, preferably in the range of 5° to 10°, to a plane normal to the fiber axis ensures a reflectivity lower than −15 dB which, added to the attenuations due to the passage through the coupler 7 of about −20 dB for each passage for example, gives an overall reflectivity seen from the end of fiber 10 of −55 dB, lower by about 15 dB than the reflectivity given by the Rayleigh scattering (about −30 dB).

The reflection phenomena in fiber 12 could also be eliminated by disposing the optical isolator 11a downstream of the couper 7, immediately before the active fiber 10, as shown in FIG. 3. This solution, which allows to avoid the use of antireflection expedients at the end of fiber 12, can be adopted in the case in which the loss of pumping power which takes place while the isolator is being crossed is not detrimental to the good operation of the amplifier.

In the case of power amplifiers directly connected downstream of the transmission laser 4 which are fed with an input signal having a high level, higher than the so-called "saturation" level beyond which the power of the transmission signal coming out of the amplifier depends only on the fed pumping power and which emit a high luminous power (higher than 4 dBm for example), such amplifiers can cause, in addition to the previously described phenomena, a noise effect given by the reflection due to the Brillouin scattering. In Brillouin scattering, the luminous power supplied to the outgoing optical line fiber from the amplifier excites vibrations in the fiber atoms, which vibrations in turn give rise to the generation of a reflected signal of a wavelength slightly shorter than the direct signal.

This reflected signal can generate beats with the direct transmission signal, so as to give origin to a noise damaging the transmission quality, being added to the previously described phenomena.

In the telecommunication line, diagrammatically shown in FIG. 1, the signal emission assembly, generally identified by the numeral 14, includes an optical isolator 15 immediately after the laser 4, which optical isolator performs the function of protecting the laser itself against reflections which could cause damage to the structure thereof. According to the invention, a power amplifier 5 which is contiguous to the assembly 14, can therefore, omit the optical isolator 11a at the input thereof, as shown in FIG. 4, because the function of eliminating the reflections towards the active fiber of the amplifier can, in this case, be accomplished by the already existing isolator 15.

The remaining parts of the power amplifier shown in FIG. 4 are similar, as regards the graphic representation, to those described for line amplifiers, and therefore, they have been allocated the same reference numerals.

By way of example, a telecommunication line has been constructed in accordance with the diagram shown in FIG. 1, by employing as the transmission laser 4 a directly modulated DFB laser of the traditional type having an emission wavelength of 1535 nm. The reception station 2 consisted of a receiver of the pin/HEMT known type, followed by wide band amplifiers not shown.

The line 3 consisted of low attenuation shifted dispersion fibers having zero dispersion close to the transmission wavelength used. The overall line length was 300 km and had an attenuation of 60 dB.

The line comprised two optical line amplifiers 6a and 6b and a power amplifier 5. These amplifiers were active-fiber amplifiers and consisted of an active silicon-based fiber 10, doped with germanium and erbium, pumped with a laser 9 consisting of a miniaturized Nd-YAG laser, doubled in frequency and diode pumped. The line amplifiers had the structure shown in FIG. 2, and the power amplifier had the structure shown in FIG. 4.

Each of the line amplifiers had an overall gain of 20 dB. The power amplifier had a saturation power equal to 9 dBm and an input power of 0 dBm.

The optical isolators 11a and 11b were polarization control isolators of a type independent of the transmission signal polarization, having isolation greater than 35 dB and reflectivity lower than −50 dB. Isolators of this kind are commercially available, and therefore, their structure will not be further described.

The end 13 of the fiber 12 connected to the pumping laser had been cut at an angle of 5°.

The transmission signal achieved by the described structure had a received power of −20 dB and a noise corresponding to −40 dBm.

For comparison, a transmission line has been constructed using the same test structure as above described, but in which commercially available optical isolators 11a and 11b were employed. The isolators 11a and 11b had reflectivity equal to −30 dB, corresponding to the reflectivity due to the Rayleigh scattering in the fiber and adapted to avoid the arising of oscillation in the presence of a gain up to 3 dB. Under these conditions, although no oscillations were present, noise having intensity of −30 dBm was observed, and such noise was sufficient to prevent the correct transmission reception. Such noise is considered to be due to the effect of the interferometric noise resulting from the Rayleigh scattering and Brillouin scattering within the active-fiber amplifiers.

The optical couplers 7 are diagrammatically shown in the drawings as fused-fiber couplers, the use of which is particularly convenient for active-fiber amplifiers. However, it is also possible to use other types of optical couplers, for example, of the type used in micro-optics. For the couplers, in particular, when they are not of the fused-fiber type, a reflectivity lower by at least 10 dB than the reflectivity given by the Rayleigh scattering or with an absolute value higher than the amplification gain for which the amplifier is intended, is required.

Although preferred embodiments of the present invention have been described and illustrated, it will be apparent to those skilled in the art that various modifications may be made without departing from the principles of the invention.

The embodiments of the invention in which an exclusive property or privilege is claimed are defined as follows:

1. An optical fiber telecommunication system, comprising an optical signal transmission station having an optical signal source for transmitting optical signals at a predetermined wavelength and an optical signal receiving station and an optical fiber line interconnecting said transmission station and said receiving station, said optical fiber line including at least one optical amplifier intermediate and interconnecting portions of said line for amplifying optical signals received by said amplifier and thereby providing amplifier gain without converting said optical signals to another form, said optical amplifier including an active fiber with a core doped with a fluorescing substance and a pumping source coupled thereto by means of a further optical fiber for providing energy to said active fiber, said active fiber having an input end coupled to the portion of said optical fiber line which is coupled to said transmission station and an output end coupled at least to another portion of said fiber line which is coupled to said receiving station, at least one said active fiber end being coupled to said further optical fiber, the improvement comprising at least energy reflection limiting means for reducing the energy reflected toward said active fiber by way of said portions of said optical fiber line and said further optical fiber, said energy reflection limiting means including a first energy refection limiting means intermediate said output end of said active fiber and said another portion of said optical fiber line, a second energy reflection limiting means intermediate said optical signal source and said input end of said active fiber and at least in the event that said further optical fiber is coupled to a said end of said active fiber without an energy reflection limiting means intermediate the point of coupling of said further optical fiber to the last-mentioned said end, said further optical fiber includes energy reflection limiting means which includes an end surface thereof spaced from said point of coupling and extending at an oblique angle to the optical axis of said further optical fiber, and each of said energy reflection limiting means has an energy reflectivity toward said active fiber which is at least 10 db lower than the energy reflectivity of said optical fiber line due to Rayleigh scattering at said predetermined wavelength.

2. An optical fiber telecommunication system, comprising an optical signal transmission station having an optical signal source for transmitting optical signals at a predetermined wavelength and an optical signal receiving station and an optical fiber line interconnecting said transmission station and said receiving station, said optical fiber line including at least one optical amplifier intermediate and interconnecting portions of said line for amplifying optical signals received by said amplifier and thereby providing amplifier gain without converting said optical signals to another form, said optical amplifier including an active fiber with a core doped with a fluorescing substance and a pumping source coupled thereto by means of a further optical fiber for providing energy to said active fiber, said active fiber having an input end coupled to the portion of said optical fiber line which is coupled to said transmission station and an output end coupled at least to another portion of said fiber line which is coupled to said receiving station, at least one said active fiber end being coupled to said further optical fiber, the improvement comprising at least energy reflection limiting means for reducing the energy reflected toward said active fiber by way of said portions of said optical fiber line and said further optical fiber, said energy reflection limiting means including a first energy reflection limiting means intermediate said output end of said active fiber and said another portion of said optical fiber line, a second energy reflection limiting means intermediate said optical signal source and said input end of said active fiber and at least in the event that said further optical fiber is coupled to a said end of said active fiber without an energy reflection limiting means intermediate the point of coupling of said further optical fiber to the last-mentioned said end, said further optical fiber includes energy reflection limiting means which includes an end surface thereof spaced from said point of coupling which has an antireflection coating thereon.

3. Optical amplifying apparatus for interconnecting an input optical fiber line connected to an optical telecommunication signal station and carrying optical telecommunication signals at a predetermined wavelength with an output optical fiber line and delivering amplified optical telecommunication signals to said output optical fiber line without conversion of the optical telecommunication signals to another form, said apparatus comprising:

an active-fiber amplifier having a predetermined amplification gain, said amplifier comprising an active optical fiber with a core doped with a fluorescing substance and with an input end and an output end, a source of optical light pumping energy, and coupling means coupling said source to said input end of said active optical fiber including an optical fiber with optical energy reflection limiting means extending from said source of optical light pumping energy to said coupling means, the last-mentioned said optical fiber having a surface at said source of pumping energy which extends at an oblique angle with respect to the optical axis of the last-mentioned said optical fiber, said surface and the attenuation caused by the last-mentioned said optical fiber providing said optical energy reflection limiting means for the last-mentioned said optical fiber; and optical energy refection limiting means in series with said input end of said active fiber and in series with said output end of said active fiber for limiting energy reflected to said active fiber by optical fibers coupled thereto, the last-mentioned said optical energy reflection limiting means having a reflectivity toward said input end and said output end of said active fiber at least 10 dB lower than the reflectivity of said optical fibers due to Rayleigh scattering at said predetermined wavelength.

4. Optical amplifying apparatus as set forth in claim 3 wherein said surface extends at an angle between 5° and 10° to a plane perpendicular to said axis.

5. Optical amplifying apparatus as set forth in claim 3 wherein said coupling means is a dichroic coupler and wherein said optical energy reflection limiting means comprises a first optical isolator interconnecting said dichroic coupler with said input end of said active fiber and a second optical isolator connected to said output end of said active fiber.

6. Optical amplifying apparatus for interconnecting an input optical fiber line connected to an optical telecommunication signal station and carrying optical telecommunication signals at a predetermined wavelength with an output optical fiber line and delivering amplified optical telecommunication signals to said output optical fiber line without conversion of the optical telecommunication signals to another form, said apparatus comprising:

an active-fiber amplifier having a predetermined amplification gain, said amplifier comprising an active optical fiber with a core doped with a fluorescing substance and with an input end and an output end, a source of optical light pumping energy, and coupling means coupling said source to said input end of said active optical fiber including an optical fiber with optical energy reflection limiting means extending from said source of optical light pumping energy to said coupling means, the last-mentioned said optical fiber having a surface at said source of pumping energy having anti-reflection coatings at said surface, said surface and the attenuation caused by the last-mentioned said optical fiber providing said optical energy reflection limiting means for the last-mentioned said optical fiber; and optical energy reflection limiting means in series with said input end of said active fiber and in series with said output end of said active fiber for limiting energy reflected to said active fiber by optical fibers coupled thereto, the last-mentioned said optical energy reflection limiting means having a reflectivity toward said input end and said output end of said active fiber at least 10 dB lower than the reflectivity of said optical fibers due to Rayleigh scattering at said predetermined wavelength.

7. Optical amplifying apparatus for interconnecting an input optical fiber line connected to an optical telecommunication signal station and carrying optical telecommunication signals at a predetermined wavelength with an output optical fiber line and delivering amplified optical telecommunication signals to said output optical fiber line without conversion of the optical telecommunication signals to another form, said apparatus comprising:

an active-fiber amplifier having a predetermined amplification gain, said amplifier comprising an active optical fiber with a core doped with a fluorescing substance and with an input end and an output end, a source of optical light pumping energy, and coupling means coupling said source to said input end of said active optical fiber including an optical fiber with optical energy reflection limiting means extending from said source of optical light pumping energy to said coupling means, the last-mentioned said optical fiber attenuating said telecommunication signals and having a surface at said source of pumping energy which extends at an oblique angle with respect to the optical axis of the last-mentioned said optical fiber, said surface and the attenuation caused by the last-mentioned said optical fiber providing said optical energy reflection limiting means for the last-mentioned said optical fiber; and optical energy reflection limiting means in series with said input end of said active fiber and in series with said output end of said active fiber for limiting energy reflected to said active fiber by optical fibers coupled thereto, the last-mentioned said optical energy reflection limiting means having a reflectivity toward said input end and said output end of said active fiber at least 15 dB lower than the reflectivity of said optical fibers due to Rayleigh scattering at said predetermined wavelength.

8. Optical amplifying apparatus for interconnecting an input optical fiber line connected to an optical telecommunication signal station and carrying optical telecommunication signals at a predetermined wavelength with an output optical fiber line and delivering amplified optical telecommunication signals to said output optical fiber line without conversion of the optical telecommunication signals to another form, said apparatus comprising:

an active-fiber amplifier having a predetermined amplification gain, said amplifier comprising an active optical fiber with a core doped with a fluorescing substance and with an input end and an output end, a source of optical light pumping energy, and coupling means coupling said source to said input end of said active optical fiber including an optical fiber with optical energy reflection limiting means extending from said source of optical light pumping energy to said coupling means, the last-mentioned said optical fiber attenuating said telecommunication signals and having a surface at said source of pumping energy having antireflection coatings at said surface, said surface and the attenuation caused by the last-mentioned said optical fiber providing said optical energy reflection limiting means for the last-mentioned said optical fiber; and optical energy reflection limiting means in series with said input end of said active fiber and in series with said output end of said active fiber for limiting energy reflected to said active fiber by optical fibers coupled thereto, the last-mentioned said optical energy reflection limiting means having a reflectivity toward said input end and said output end of said active fiber at least 15 dB lower than the reflectivity of said optical fibers due to Rayleigh scattering at said predetermined wavelengths.

9. An optical signal transmission system for transmitting optical signals at a predetermined wavelength from a transmitter to a receiver of such optical signals at a long distance from said transmitter, said system comprising:

a transmitter of optical signals at said predetermined wavelength;

an active fiber amplifier for amplifying signals at said predetermined wavelength having an input and an output and comprising an active fiber of predetermined length connecting said amplifier input and output, said amplifier having a gain greater than 15 dB;

a receiver of optical signals at said predetermined wavelength;

a first optical transmission line fiber having a first line fiber input at one end thereof connected to said transmitter of optical signals and a first line fiber output at the other end thereof;

first interconnecting means interconnecting said first line fiber output with said active fiber amplifier at said input of the latter;

a second optical transmission line fiber having a second line fiber output at one end thereof connected to said receiver of optical signals and having a second line fiber input at the other end thereof; and second interconnecting means interconnecting said output of said active fiber amplifier with said second line fiber input;

at least one of said first optical transmission line fiber and second optical transmission line fiber having a length between the input and output thereof greater than said predetermined length of said active fiber and such that optical signals applied to the input thereof are significantly attenuated in travelling from the input to the output thereof and having a length such that a portion of optical signals at said predetermined wavelength applied to the other end of said one of said first optical transmission line fiber and said second optical transmission line fiber are reflected back toward said active fiber amplifier, due to Rayleigh scattering, in an amount sufficient to reduce the signal-to-noise ratio at said receiver;

the one of said first and second interconnecting means interconnecting said one of said first optical transmission line fiber and said second optical transmission line fiber with said active fiber comprising a unidirectional optical isolator which substantially prevents optical signals due to Rayleigh scattering from entering said amplifier while transmitting optical signals at said predetermined wavelength; and said active fiber amplifier also comprising a pumping signal source, and a further optical fiber connecting said pumping signal source and said active fiber, said further optical fiber having an energy reflection limiting means;

said unidirectional optical isolator and said energy reflection limiting means of said further optical fiber having a reflectivity toward said active fiber at said signal wavelength lower by at least 10 dB than the reflectivity due to Rayleigh scattering in any of said first or second optical transmission line fibers;

whereby reflected optical signals, including at least optical signals reflected in said one of said first optical transmission line fiber and in said second optical transmission line fiber and in said further fiber, are substantially prevented from reaching said active fiber.

10. An optical signal transmission system as set forth in claim 9 wherein said transmitter of optical signals is connected to said first line fiber input by a said energy reflection limiting means.

11. An optical signal transmission system as set forth in claim 9 wherein said reflectivity of said unidirectional optical isolator and said energy reflecting limiting means is lower by at least 15 dB than the reflectivity due to Rayleigh scattering.

12. An optical signal transmission system for transmitting optical signals at a predetermined wavelength from a transmitter to a receiver of such optical signals, at a long distance from said transmitter, said system comprising:

a transmitter of optical signals at said predetermined wavelength;

an active fiber amplifier for amplifying signals at said predetermined wavelength having an input and an output and comprising an active fiber of predetermined length connecting said input and output, said amplifier having a gain greater than 15 dB;

a receiver of optical signals at said predetermined wavelength;

a first optical transmission line fiber having a first line fiber input at one end thereof connected to said transmitter of optical signals and a first line fiber output at the other end thereof;

first interconnecting means interconnecting said first line fiber output with said active fiber amplifier at said input of the latter;

a second optical transmission line fiber having a second line fiber output at one end thereof connected to said receiver of optical signals and having a second line fiber input at the other end thereof; and second interconnecting means interconnecting said output of said active fiber amplifier with said second line fiber input;

at least one of said first optical transmission line fiber and second optical transmission line fiber having a length between the input and output thereof greater than said predetermined length of said active fiber and such that optical signals applied to the input thereof are significantly attenuated in travelling from the input to the output thereof and having a length such that a portion of optical signals at said predetermined wavelength applied to the other end of said one of said first optical transmission line fiber and said second optical transmission line fiber are reflected back toward said active fiber amplifier, due to Rayleigh scattering in an amount sufficient to reduce the signal-to-noise ratio at said receiver;

the one of said first and second interconnecting means interconnecting said one of said first optical transmission line fiber and said second optical transmission line fiber with said active fiber comprising a unidirectional optical isolator which substantially prevents optical signals due to Rayleigh scattering from entering said amplifier while transmitting optical signals at said predetermined wavelength; and said active fiber amplifier comprising a pumping signal source and a further optical fiber connecting said pumping signal source and said active fiber, said further optical fiber having an energy reflection limiting means;

the reflectivities of said optical isolator and said energy reflection limiting means of said further optical fiber at said signal wavelength having an absolute value greater by at least 10 dB than said amplifier gain;

whereby reflected optical signals, including at least optical signals reflected in said one of said first optical transmission line fiber and said second optical transmission line fiber and in said further fiber, are substantially prevented from reaching said active fiber.

13. An optical signal transmission system as set forth in claim 12 wherein said transmitter of optical signals is connected to said first line fiber input by a said energy reflection limiting means.

14. An optical signal transmission system as set forth in claim 9 wherein said reflectivity of said optical isolator and said energy reflecting limiting means is lower by at least 15 dB than the reflectivity due to Rayleigh scattering.

15. An optical signal transmission system for transmitting optical signals at a predetermined wavelength from a transmitter to a receiver of such optical signals, at a long distance from said transmitter, said system comprising:

a transmitter of optical signals at said predetermined wavelength;

an active fiber amplifier for amplifying signals at said predetermined wavelength having an input and an output and comprising an active fiber of predetermined length connecting said input and output, said amplifier having a gain greater than 15 dB;

a receiver of optical signals at said predetermined wavelength;

a first optical transmission line fiber having a first line fiber input at one end thereof connected to said transmitter of optical signals and a first line fiber output at the other end thereof;

first interconnecting means interconnecting said first line fiber output with said active fiber amplifier at said input of the latter;

a second optical transmission line fiber having a second line fiber output at one end thereof connected to said receiver of optical signals and having a second line fiber input at the other end thereof; and second interconnecting means interconnecting said output of said active fiber amplifier with said second line fiber input;

at least one of said first optical transmission line fiber and second optical transmission line fiber having a length between the input and output thereof greater than said predetermined length of said active fiber and such that optical signals applied to the input thereof are significantly attenuated in travelling from the input to the output thereof and having a length such that a portion of optical signals at said predetermined wavelength applied to the other end of said one of said first optical transmission line fiber and said second optical transmission line fiber are reflected back toward said active fiber amplifier, due to Rayleigh scattering, in an amount sufficient to reduce the signal-to-noise ratio at said receiver;

the one of said first and second interconnecting means interconnecting said one of said first optical transmission line fiber and said second optical transmission line fiber with said active fiber comprising a unidirectional optical isolator which substantially prevents optical signals due to Rayleigh scattering from entering said amplifier while transmitting optical signals at said predetermined wavelength; and said active fiber amplifier comprising a pumping signal source, a further optical fiber connecting said pumping signal source and said active fiber, and an energy reflection limiting means interposed between said pumping signal source and said active fiber;

the reflectivities of said optical isolator and said energy reflection limiting means of said further optical fiber at said signal wavelength having an absolute value greater by at least 10 dB than said amplifier gain;

whereby reflected optical signals, including at least optical signals reflected in said one of said first optical transmission line fiber and said second optical transmission line fiber and in said further fiber, are substantially prevented from reaching said active fiber.

16. An optical signal transmission system as set forth in claim 15 wherein said energy reflection limiting means is interposed between said further optical fiber and said active fiber.

17. An optical signal transmission system as set forth in claim 15 wherein said energy reflection limiting means is interposed between said pumping signal source and said further optical fiber.

18. An optical signal transmission system as set forth in claim 15 wherein said absolute value is higher than said amplification gain by at least 15 dB.

19. An optical signal transmission system for transmitting optical signals at a predetermined wavelength from a transmitter to a receiver of such optical signals at a long distance from said transmitter, said system comprising:

a transmitter of optical signals at said predetermined wavelength;

an active fiber amplifier for amplifying signals at said predetermined wavelength having an input and an output and comprising an active fiber of predetermined length connecting said amplifier input and output, said amplifier having a gain greater than 15 dB;

a receiver of optical signals at said predetermined wavelength;

a first optical transmission line fiber having a first line fiber input at one end thereof connected to said transmitter of optical signals and a first line fiber output at the other end thereof;

first interconnecting means interconnecting said first line fiber output with said active fiber amplifier at said input of the latter;

a second optical transmission line fiber having a second line fiber output at one end thereof connected to said receiver of optical signals and having a second line fiber input at the other end thereof; and second interconnecting means interconnecting said output of said active fiber amplifier with said second line fiber input;

at least one of said first optical transmission line fiber and second optical transmission line fiber having a length between the input and output thereof greater than said predetermined length of said active fiber and such that optical signals applied to the input thereof are significantly attenuated in travelling from the input to the output thereof and having a length such that a portion of optical signals at said predetermined wavelength applied to the other end of said one of said first optical transmission line fiber and said second optical transmission line fiber are reflected back toward said active fiber amplifier, due to Rayleigh scattering, in an amount sufficient to reduce the signal-to-noise ratio at said receiver;

the one of said first and second interconnecting means interconnecting said one of said first optical transmission line fiber and said second optical transmission line fiber with said active fiber comprising a unidirectional optical isolator which substantially prevents optical signals due to Rayleigh scattering from entering said amplifier while transmitting optical signals at said predetermined wavelength; and said active fiber amplifier also comprising a pumping signal source, a further optical fiber connecting said pumping signal source and said active fiber and an energy reflection limiting means interposed between said pumping signal source and said active fiber;

said unidirectional optical isolator and said energy reflection limiting means of said further optical fiber having a reflectivity toward said active fiber at said signal wavelength lower by at least 10 dB than the reflectivity due to Rayleigh scattering in any of said first or second optical transmission line fibers;

whereby reflected optical signals, including at least optical signals reflected in said one of said first optical transmission line fiber and in said second optical transmission line fiber and in said further fiber, are substantially prevented from reaching said active fiber.

20. An optical signal transmission system as set forth in claim 19 wherein said energy reflection limiting means is interposed between said further optical fiber and said active fiber.

21. An optical signal transmission system as set forth in claim 19 wherein said energy reflection limiting means is interposed between said pumping signal source and said further optical fiber.

22. An optical signal transmission system as set forth in claim 19 wherein said reflectivity of said unidirectional optical isolator and said energy reflecting limiting means is lower by at least 15 dB than the reflectivity due to Rayleigh scattering.

23. An optical signal transmission system as set forth in claim 19 wherein said unidirectional optical isolator is a polarization control optical isolator.

24. An optical signal transmission system as set forth in claim 23 wherein said polarization control optical isolator is insensitive to the polarization of the optical signal transmitted by said transmitter.

25. An optical signal transmission system for transmitting optical signals at a predetermined wavelength from a transmitter to a receiver of such optical signals, at a long distance from said transmitter, said system comprising:

a transmitter of optical signals at said predetermined wavelength;

an active fiber amplifier for amplifying signals at said predetermined wavelength having an input and an output and comprising an active fiber of a predetermined length connecting said input and output, said amplifier having a gain greater than 15 dB;

a first optical transmission line fiber, having a first line fiber input connected to said transmitter of optical signals at said predetermined wavelength and a first line fiber output, said first optical transmission line fiber having a length between its input and output greater than said predetermined length of said active fiber and such that optical signals at said predetermined wavelength applied to said first line fiber input are significantly attenuated in travelling from said first line fiber input to said first line fiber output and having a length such that a portion optical signals applied to said first line fiber output are reflected back toward said first line fiber output, due to Rayleigh scattering, in an amount sufficient to reduce the signal-to-noise ratio at said receiver;

a receiver of optical signals at said predetermined wavelength;

a second optical transmission line fiber having a second line fiber input and a second line fiber output connected to said receiver of optical signals at said predetermined wavelength, said second optical transmission line fiber having a length greater than said predetermined length of said active fiber and such that a portion of optical signals applied to said second line fiber input are reflected back toward said second line fiber input, due to Rayleigh scattering, in an amount sufficient to reduce the signal-to-noise ratio at said receiver;

first connecting means interconnecting said first line fiber output with said input of said active fiber amplifier and comprising a first optical isolator optically connected to said first line fiber output and to said input of said active fiber amplifier for supplying optical signals at said first line fiber output to said input of said active fiber amplifier, said first optical isolator being unidirectional for transmitting optical signals substantially only from said first line fiber output to said input of said active fiber amplifier, and said first interconnecting means having a reflectivity lower by at least 10 dB than the reflectivity to Rayleigh scattering of said first optical transmission line fiber;

second interconnecting means interconnecting said output of said active fiber amplifier with said second line fiber input, comprising a second optical isolator optically connected to said output of said active fiber amplifier and to said second line fiber input; for supplying optical signals at said output of said active fiber amplifier to said second line fiber input, said second optical isolator being unidirectional for transmitting optical signals substantially only from said output of said active fiber amplifier to said second line fiber input, and said second interconnecting means having a reflectivity lower by at least 10 dB than the reflectivity due to Rayleigh scattering of said second optical transmission line fiber; and said active fiber amplifier also comprising a pumping signal source, and a further optical fiber connecting said pumping signal source and said active fiber, said further optical fiber having an energy reflection limiting means having a reflectivity toward said active fiber at said signal wavelength lower by at least 10 dB than reflectivity due to Rayleigh scattering in any of said first or second optical transmission line fiber;

whereby reflected optical signals, including optical signals reflected in said first optical transmission line fiber, in said second optical transmission line fiber and in said further fiber, are substantially prevented from reaching said active fiber.

26. An optical signal transmission system for transmitting optical signals at a predetermined wavelength from a transmitter to a receiver of such optical signals, at a long distance from said transmitter, said system comprising:

a transmitter of optical signals at said predetermined wavelength;

an active fiber amplifier for amplifying signals at said predetermined wavelength having an input and an output and comprising an active fiber of predetermined length connecting said input and output, said amplifier having a gain greater that 15 dB;

a first optical transmission line fiber having a first line fiber input connected to said transmitter of optical signals at said predetermined wavelength and a first line fiber output, said first optical transmission line fiber having a length between its input and output greater than said predetermined length of said active fiber and such that optical signals at said predetermined wavelength applied to said first line fiber input are significantly attenuated in travelling from said first line fiber input to said first line fiber output and having a length such that a portion of optical signals applied to said first line fiber output are reflected back toward said first line fiber output, due to Rayleigh scattering, in an amount sufficient to reduce the signal-to-noise ratio at said receiver;

a receiver of optical signals at said predetermined wavelength;

a second optical transmission line fiber having a second line fiber input and a second line fiber output connected to said receiver of optical signals at said predetermined wavelength, said second optical transmission line fiber having a length greater than said predetermined length of said active fiber and such that a portion of optical signals applied to said second line fiber input are reflected back toward said second line fiber input, due to Rayleigh scattering in an amount sufficient to reduce the signal-to-noise ratio at said receiver;

first interconnecting means interconnecting said first line fiber output with said input of said active fiber amplifier and comprising a first optical isolator optically connected to said first line fiber output and to said input of said active fiber amplifier for supplying optical signals at said first line fiber output to said input of said active fiber amplifier, said first optical isolator being unidirectional for transmitting optical signals substantially only from said first line fiber output to said input of said active fiber amplifier;

second interconnecting means interconnecting said output of said active fiber amplifier with said second line fiber input and comprising a second optical isolator optically connected to said output of said active fiber amplifier and to said second line fiber input, for supplying optical signals at said output of said active fiber amplifier to said second line fiber input, said second optical isolator being unidirectional for transmitting optical signals substantially only from said output of said active fiber amplifier to said second line fiber input; and said active fiber amplifier also comprising a pumping signal source, and a further optical fiber connecting said pumping signal source and said active fiber, said further optical fiber having an energy reflection limiting means;

the reflectivities of said first optical isolator, said second optical isolator and said energy reflection limiting means toward said active fiber at said signal wavelength having an absolute value greater by at least 10 dB than said amplifier gain;

whereby reflected optical signals, including optical signals reflected in said first optical transmission line fiber, in said second optical transmission line fiber and in said further fiber, are substantially prevented from reaching said active fiber.

27. An optical signal transmission system as set forth in claims 25 or 26 wherein said first optical isolator and said second optical isolator are polarization control isolators.

28. An optical signal transmission system as set forth in claim 25 or 26 wherein said first interconnecting means further comprises a dichroic coupler having two inputs and an output, one of said inputs of said dichroic coupler being connected to said first line fiber output, said output of said dichroic coupler being connected to said first optical isolator and the other of said inputs of said dichroic coupler being connector said further optical fiber.

29. An optical signal transmission system as set forth in claim 11 wherein each said optical isolator is insensitive to the polarization of said optical signals.

30. An optical signal transmission system as set forth in claim 25 wherein said reflectivities of said reflection limiting means, said first optical isolator, and said second optical isolator is 15 dB lower than said reflectivity due to Rayleigh scattering.

31. An optical signal transmission system as set forth in claim 14 wherein said absolute value is higher than said amplification gain by at least 15 dB.

* * * * *

UNITED STATES PATENT AND TRADEMARK OFFICE
CERTIFICATE OF CORRECTION

PATENT NO. : 5,210,808
DATED : May 11, 1993
INVENTOR(S) : Grasso etal

It is certified that error appears in the above-identified patent and that said Letters Patent is hereby corrected as shown below:

Col. 1, line 28, after "552,918" insert a comma (,);

Col. 2, line 55, after "wavelength" insert a period (.);

Col. 10, line 13, "db" should read --dB--;

Col. 18, line 18, after "portion" insert --of--;

Col. 18, line 56, after 'input" change the semi-colon (;) to a comma (,);

Col. 20, line 44, change "connector" to --connected to--;

Signed and Sealed this

Fifteenth Day of March, 1994

BRUCE LEHMAN

Attest:

Attesting Officer

Commissioner of Patents and Trademarks